United States Patent
Tokuyama et al.

(10) Patent No.: US 11,691,676 B2
(45) Date of Patent: Jul. 4, 2023

(54) FRONT END STRUCTURE OF VEHICLE BODY

(71) Applicants: TOYOTA JIDOSHA KABUSHIKI KAISHA, Toyota (JP); SUBARU CORPORATION, Tokyo (JP)

(72) Inventors: Koji Tokuyama, Nishio (JP); Yoshihiro Itoh, Nisshin (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/345,684

(22) Filed: Jun. 11, 2021

(65) Prior Publication Data

US 2022/0024521 A1    Jan. 27, 2022

(30) Foreign Application Priority Data

Jul. 27, 2020  (JP) ................................. 2020-126273

(51) Int. Cl.
| | |
|---|---|
| *B62D 25/08* | (2006.01) |
| *B60R 19/52* | (2006.01) |
| *B60Q 5/00* | (2006.01) |
| *G10K 9/22* | (2006.01) |
| *B60R 19/48* | (2006.01) |

(52) U.S. Cl.
CPC ............... *B62D 25/08* (2013.01); *B60Q 5/00* (2013.01); *B60R 19/52* (2013.01); *B60R 19/48* (2013.01); *B60R 2019/527* (2013.01); *B62D 25/085* (2013.01); *G10K 9/22* (2013.01)

(58) Field of Classification Search
CPC ........ B62D 25/08; B62D 25/085; B60Q 5/00; B60R 19/52; B60R 2019/527; B60R 19/48; G10K 9/22
USPC ..................................................... 296/193.07
See application file for complete search history.

(56) References Cited

U.S. PATENT DOCUMENTS

| | | | |
|---|---|---|---|
| 2016/0368364 A1* | 12/2016 | Aoki ..................... | B60K 11/08 |
| 2017/0050509 A1* | 2/2017 | Aizawa ................. | B60K 11/08 |

FOREIGN PATENT DOCUMENTS

| | | | |
|---|---|---|---|
| JP | S62-185154 U | | 11/1987 |
| JP | S63-57139 U | | 4/1988 |
| JP | 2004-330852 A | | 11/2004 |
| JP | 2004330852 A | * | 11/2004 |
| JP | 2017-8748 A | | 1/2017 |
| JP | 2018-127060 A | | 8/2018 |

* cited by examiner

*Primary Examiner* — Joseph D. Pape
*Assistant Examiner* — Dana D Ivey
(74) *Attorney, Agent, or Firm* — Oliff PLC

(57) ABSTRACT

A front end structure of a vehicle body may include: a horn; a bumper cover; an inner grille disposed between the horn and the bumper cover, and a megaphone including a megaphone wall defining a megaphone opening extending along a direction along which the horn and the bumper cover are aligned, wherein a first opening end of the megaphone opposes the horn, a second opening end of the megaphone opposes the bumper cover, and the megaphone is integrated with the inner grille.

10 Claims, 2 Drawing Sheets

FRONT END STRUCTURE OF VEHICLE BODY

CROSS-REFERENCE TO RELATED APPLICATION

This application claims priority to Japanese Patent Application No. 2020-126273 filed on Jul. 27, 2020, the contents of which are hereby incorporated by reference into the present application.

TECHNICAL FIELD

The technique disclosed herein relates to a front end structure of a vehicle body.

BACKGROUND

Japanese Patent Application Publication No. 2018-127060 describes a front end structure of a vehicle body in which a horn is disposed in an engine room. A sound made by the horn travels frontward beyond a bumper cover, that is, frontward of the vehicle body.

SUMMARY

When, for example, a worker holds a bumper cover when he/she is washing a vehicle body, an external pressure may be applied to the bumper cover. To increase stiffness against such a pressure (hereinbelow this stiffness may be referred to as "pressure stiffness"), an inner grille may be disposed rearward of the bumper cover. The inner grille is disposed in proximity to a rear surface of the bumper cover to increase the pressure stiffness of the bumper cover.

Consequently, the inner grille is disposed between the bumper cover and a horn, thereby exists at a position blocking a sound made by the horn from traveling. For example, if the inner grille is downsized so as not to block the sound made by the horn from traveling, sufficient pressure stiffness of the bumper cover may not be provided. As above, a technique to ensure both a pressure stiffness and a sound pressure of a horn is required in a front end structure of a vehicle body in which an inner grille is disposed between a bumper cover and the horn.

A front end structure of a vehicle body disclosed herein may comprise a horn; a bumper cover; an inner grille disposed between the horn and the bumper cover, and a megaphone including a megaphone wall defining a megaphone opening extending along a direction along which the horn and the bumper cover are aligned. In this front end structure, a first opening end of the megaphone opposes the horn, and a second opening end of the megaphone opposes the bumper cover. Further, in this front end structure, the megaphone is integrated with the inner grille.

In the front end structure of the vehicle body disclosed herein, a sound made by the horn travels frontward beyond the vehicle through the megaphone opening of the megaphone. In addition, since the megaphone is integrated with the inner grille, stiffness of the inner grille is maintained high by the megaphone wall even though the megaphone is disposed. As a result, when an external pressure is applied to the bumper cover, the inner grille can mitigate formation of a dent on the bumper cover. As such, in the front end structure of the vehicle body disclosed herein, it is possible to ensure both the pressure stiffness and the sound pressure of the horn even when the inner grille is disposed between the bumper cover and the horn.

DETAILED DESCRIPTION

Figure 1:
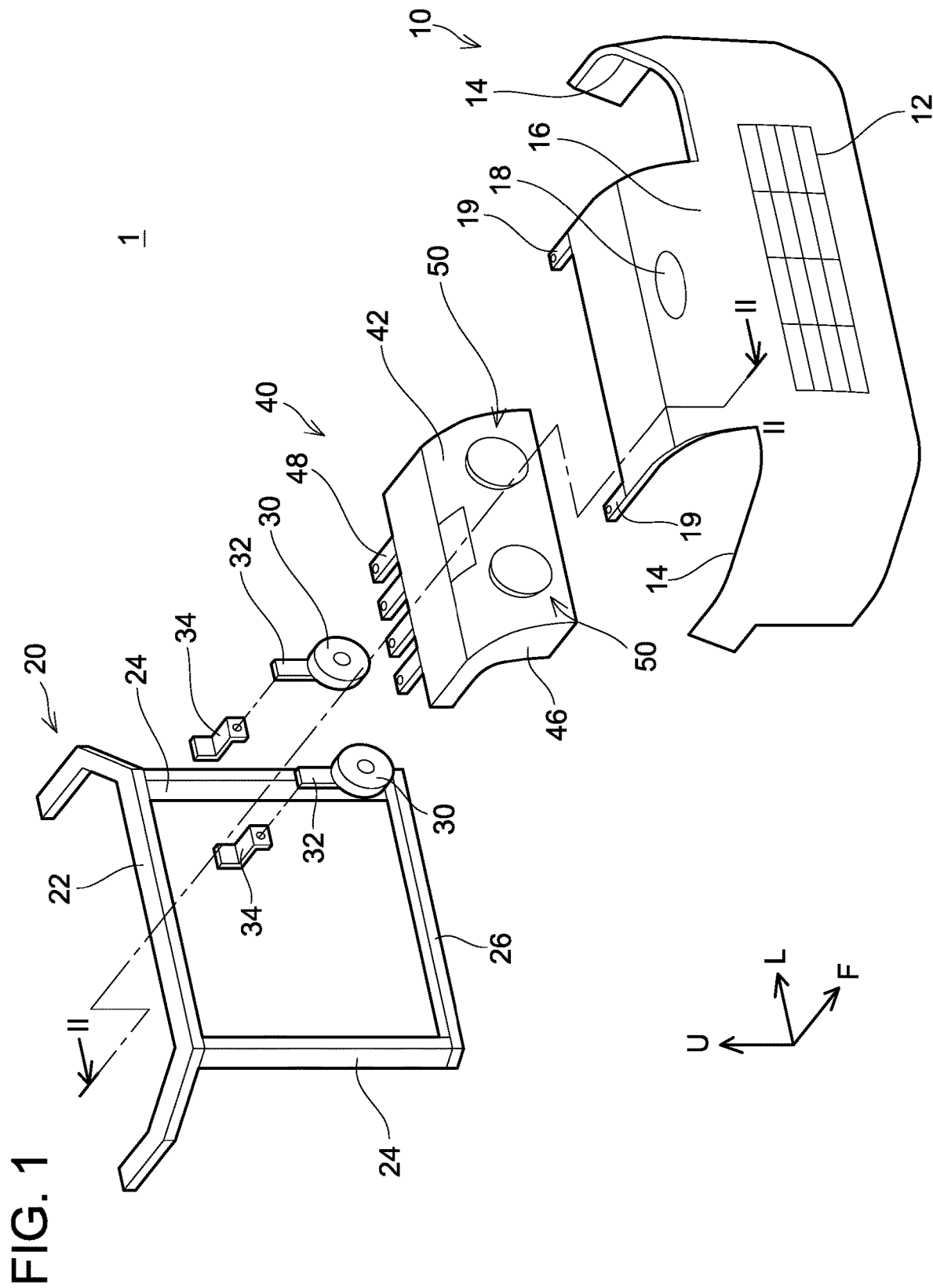
FIG. 1 illustrates an exploded partial perspective view of a front end structure of a vehicle body.

An aspect of the front end structure of the vehicle body disclosed herein may comprise a horn; a bumper cover; an inner grille disposed between the horn and the bumper cover, and a megaphone including a megaphone wall defining a megaphone opening extending along a direction along which the horn and the bumper cover are aligned. The inner grille may have a function of enhancing pressure stiffness of the bumper cover. A first opening end of the megaphone opposes the horn, and a second opening end of the megaphone opposes the bumper cover. Due to this, the megaphone can have a function of delivering a sound made by the horn frontward beyond the vehicle. In the aforementioned embodiment, the megaphone is integrated with the inner grille. Here, the inner grille and the megaphone, which are separate members, may be integrated, or the inner grill and the megaphone, which are made from the same material, may be integrally formed.

In the above embodiment, the second opening end of the megaphone may be exposed from an opening defined in the bumper cover or may be hidden by the bumper cover when viewed from a front of the vehicle. When the second opening end is hidden by the bumper cover, the bumper cover vibrates due to the sound made by the horn, and the sound travels frontward beyond the vehicle through this vibration. When the second opening end is hidden by the bumper cover, since the opening for delivering the sound frontward beyond the vehicle is not defined in the bumper cover, aerodynamics of the vehicle can be increased. In addition, when the second opening end is hidden by the bumper cover, a space may be provided between the bumper cover and the inner grille. Generation of noise due to collision between the bumper cover and the inner grille caused by the vibration of the bumper cover can be reduced.

In the above embodiment, a cross-sectional shape of the megaphone opening in a cross section that is perpendicular to the direction along which the horn and the bumper cover are aligned may be round. In addition, a cross-sectional area of the megaphone opening in a cross section that is perpendicular to the direction along which the horn and the bumper cover are aligned may monotonically increase from the first opening end toward the second opening end. For example, the cross-sectional area may continuously increase or increase in a step-wise fashion from the first opening end toward the second opening end. In the case of the continuous increase, an increasing rate may be constant or vary between the first opening end and the second opening end. The megaphone as described above can efficiently deliver the sound made by the horn frontward beyond the vehicle.

Hereinbelow, a front end structure 1 of a vehicle body will be described with reference to the drawings. "F" in the coordinate system illustrated in the drawings indicates a front side relative to a front-rear direction of the vehicle body, "U" indicates an upper end relative to an up-down direction of the vehicle body, and "L" indicates a left side relative to a width direction of the vehicle body as viewed from the rear of the vehicle body looking forward.

As illustrated in FIG. 1, the front end structure 1 of the vehicle body includes a bumper cover 10, a radiator support 20, horns 30, an inner grille 40, and megaphones 50.

Although this is a mere example, the bumper cover 10 is substantially rectangular when viewed from the front of the vehicle, and constitutes a front surface of the vehicle body. The bumper cover 10 includes, at a part of its lower portion, a grille 12 that extends in the width direction, and wind which hits the vehicle while the vehicle is traveling enters into a front space (an engine room) through the grille 12. Recesses 14 that conform with shapes of head lights are defined at upper portions of respective ends of the bumper cover 10 relative to the width direction. The bumper cover 10 includes a bumper cover upper portion 16 at a central upper portion in the width direction and positioned between the pair of recesses 14. The bumper cover upper portion 16 extends while curving toward a rear side of the vehicle, and an emblem 18 is attached to its front surface. A pair of fixing plates 19 is attached to respective ends of the bumper cover upper portion 16, and the bumper cover 10 is fixed to the radiator support 20 via the fixing plates 19.

Although this is a mere example, the radiator support 20 is disposed in the front space (the engine room) and has a frame-shaped structure when viewed from the front of the vehicle. The radiator support 20 includes a support upper portion 22 that extends in the width direction, a support lower portion 26 that extends in the width direction below the support upper portion 22, and a pair of support side portions 24 that extends in the up-down direction and connects ends of the support upper portion 22 to ends of the support lower portion 26. A radiator (not shown) is disposed rearward of the radiator support 20.

Although this is a mere example, each of the horns 30 includes a diaphragm disposed to open toward a position frontward beyond the vehicle. Vibration of the diaphragm makes a sound, and the sound that has been made travels frontward beyond the vehicle. The horns 30 are respectively attached to horn plates 32, and the horn plates 32 are fixed to the support upper portion 22 via respective horn brackets 34.

The inner grille 40 is disposed between the bumper cover 10 and the horns 30, and disposed in proximity to a rear surface of the bumper cover 10. Here, when, for example, a worker holds the bumper cover upper portion 16 of the bumper cover 10 when he/she is washing the vehicle, an external pressure may be applied to the bumper cover upper portion 16. The inner grille 40 is disposed in proximity to the rear surface of the bumper cover upper portion 16 to increase stiffness against such a pressure, that is, to increase the pressure stiffness.

Figure 2:
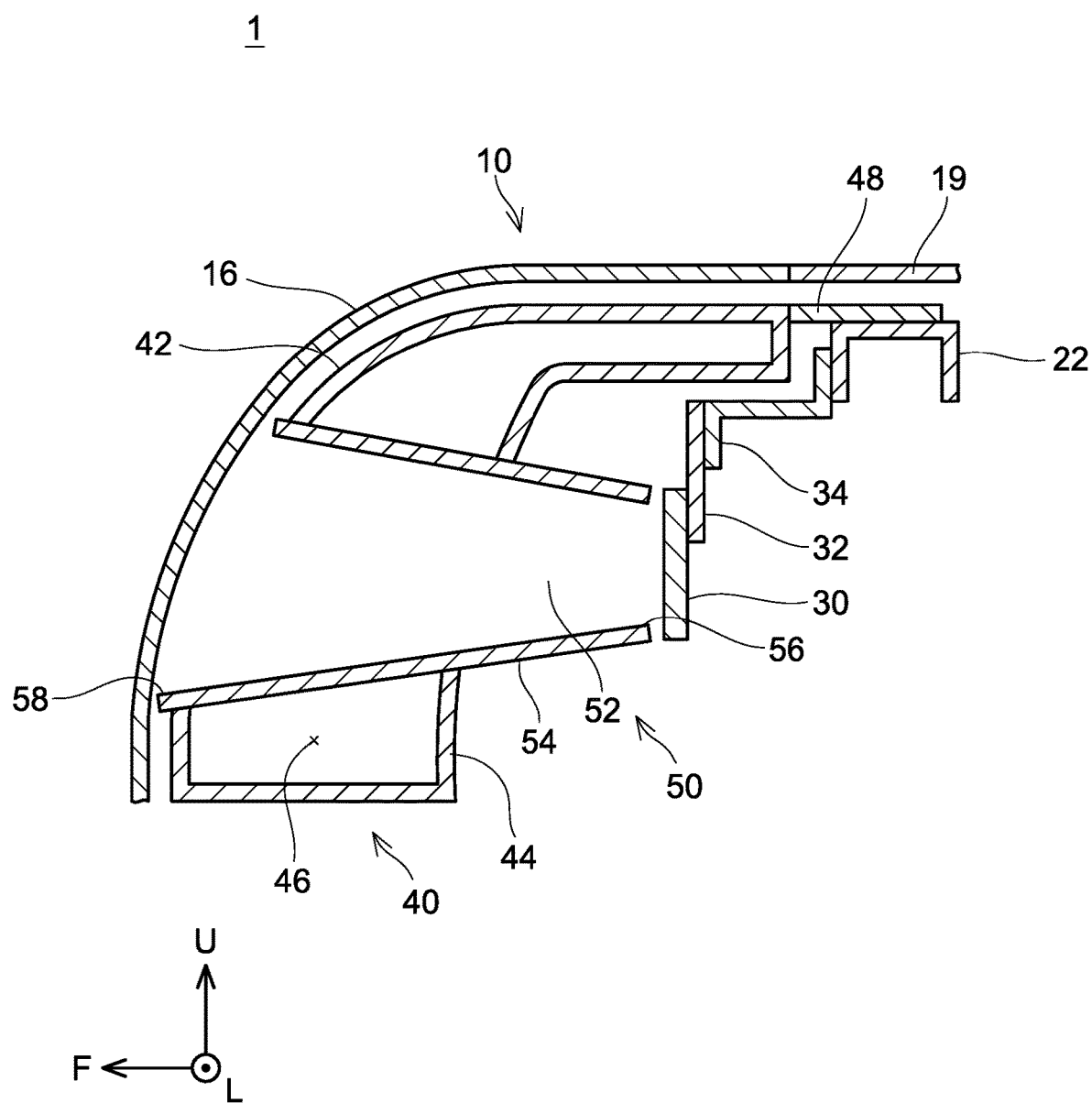
FIG. 2 illustrates a partial cross-sectional view of the front end structure of the vehicle body along a II-II line of FIG. 1.

Although this is a mere example, as illustrated in FIG. 2, the inner grille 40 includes an opposing wall 42, a rear wall 44 disposed behind the opposing wall 42, a plurality of rim walls 46 connecting the opposing wall 42 to the rear wall 44, and fixing plates 48. The opposing wall 42 is a plate-shaped member extending along a curved shape of the rear surface of the bumper cover upper portion 16, and disposed such that the opposing wall 42 opposes a substantially entirety of the bumper cover upper portion 16. The opposing wall 42 and the bumper cover upper portion 16 are not in direct contact, and are spaced apart by a predetermined distance. The rear wall 44 is mesh-shaped when viewed from the rear side of the vehicle. Each of the plurality of rim walls 46 is a plate-shaped member extending from a rear surface of the opposing wall 42 to a front surface of the rear wall 44. The plurality of rim walls 46 is lined up in the width direction between the opposing wall 42 and the rear wall 44. Due to this, the opposing wall 42 is supported by the rear wall 44 and the plurality of rim walls 46, by which stiffness of the opposing wall 42 is increased. The inner grille 40 is fixed to the support upper portion 22 of the radiator support 20 via the fixing plates 48. As described above, since the opposing wall 42 of the inner grille 40 is disposed in proximity to the rear surface of the bumper cover upper portion 16, formation of a dent on the bumper cover upper portion 16 is reduced by the opposing wall 42 when the external pressure is applied to the bumper cover upper portion 16, by which the pressure stiffness of the bumper cover 10 is increased.

Each of the megaphones 50 includes a megaphone wall 54 defining a megaphone opening 52 extending along a direction along which the horns 30 and the bumper cover 10 are aligned (in this embodiment, the front-rear direction of the vehicle body). A first opening end 56, which is on one side of each megaphone 50, opposes its corresponding one of the horns 30, and a second opening end 58, which is on the other side of each megaphone 50, opposes the bumper cover upper portion 16. The horns 30 are disposed to be exposed from the first opening ends 56 when viewed from the second opening ends 58. The second opening ends 58 are hidden by the bumper cover upper portion 16 of the bumper cover 10 when viewed from the front of the vehicle body.

The megaphones 50 are disposed to penetrate the inner grille 40. Specifically, the megaphone wall 54 of each megaphone 50 extends between the rear wall 44 and the opposing wall 42 of the inner grille 40, that is, inside the inner grille 40. In addition, the megaphone wall 54 of each megaphone 50 projects rearward from the rear wall 44 of the inner grille 40 such that the first opening end 56 of the megaphone 50 is positioned rearward of the rear wall 44 of the inner grille 40. Due to this, the first opening end 56 of the megaphone 50 can oppose its corresponding one of the horns 30 at a position proximate thereto. In addition, the megaphone wall 54 of each megaphone 50 projects frontward from the opposing wall 42 of the inner grille 40 such that the second opening end 58 of the megaphone 50 is positioned frontward of the opposing wall 42 of the inner grille 40. Due to this, the second opening end 58 of each megaphone 50 can oppose the bumper cover upper portion 16 of the bumper cover 10 at a position proximate thereto.

A cross-sectional shape of each megaphone opening 52 that is perpendicular to the direction along which the horns 30 and the bumper cover 10 are aligned is round. In other words, a cross-sectional shape of the megaphone wall 54 is round. In addition, a cross-sectional area of each megaphone opening 52 that is perpendicular to the direction along which the horns 30 and the bumper cover 10 are aligned monotonically increases from the first opening end 56 toward the second opening end 58. As such, the megaphones 50 have a megaphone shape that is substantially conical as is well-known.

The megaphones 50 as described above can efficiently deliver the sound made by the horns 30 from the first opening ends 56 to the second opening ends 58 through the megaphone openings 52, and thereby vibrate the bumper cover 10. The bumper cover 10 functions as a diaphragm, by which the sound made by the horns 30 travels frontward beyond the vehicle. Since the opposing wall 42 of the inner grille 40 and the bumper cover upper portion 16 of the bumper cover 10 are disposed while spaced apart by the predetermined distance, generation of noise due to collision between the bumper cover upper portion 16 and the opposing wall 42 caused by vibration of the bumper cover 10 can be reduced.

The megaphones 50 are integrated with the inner grille 40. In this embodiment, the megaphones 50 and the inner grille 40 are made from the same resin, and the megaphones 50 and the inner grille 40 are integrally formed. Due to this, as with the rim walls 46 connecting the opposing wall 42 to the rear wall 44, the megaphone walls 54 of the megaphones 50 can support the opposing wall 42 and have a function of enhancing the stiffness of the opposing wall 42. In particular, since the cross-sectional shape of the megaphone walls 54 is round, the stiffness of the megaphone walls 54 is high. Due to this, even when the megaphones 50 are disposed to penetrate the inner grille 40, the stiffness of the opposing wall 42 of the inner grille 40 can be maintained high. As a result, the pressure stiffness of the bumper cover 10 can be maintained high.

As described above, in the front end structure 1 of the vehicle body disclosed herein, since the megaphones 50 are disposed, the sound made by the horns 30 travels frontward beyond the vehicle through the megaphone openings 52 of the megaphones 50. In addition, since the megaphones 50 are integrated with the inner grille 40, the stiffness of the inner grille 40 is maintained high by the megaphone walls 54 of the megaphones 50, by which the pressure stiffness of the bumper cover 10 is also maintained high. As such, in the front end structure 1 of the vehicle body disclosed herein, both the pressure stiffness and the sound pressure of the horns can be ensured even when the inner grille 40 is disposed between the bumper cover 10 and the horns 30.

In the above embodiment, the opposing wall 42 of the inner grille 40 is disposed to oppose the bumper cover upper portion 16 of the bumper cover 10. The opposing wall 42 of the inner grille 40 only needs to be disposed at a position corresponding to a part of the bumper cover 10 where the pressure stiffness thereof is to be increased, and may be disposed to oppose any part of the rear surface of the bumper cover 10. In addition, the shape of the inner grille 40 is not particularly limited. As long as the inner grille 40 includes the opposing wall 42, the inner grille 40 can have a function of enhancing the pressure stiffness of the bumper cover 10. Consequently, any configuration and shape may be employed in the other configurations except the configuration of the opposing wall 42 of the inner grille 40.

In the above embodiment, the inner grille 40 and the megaphones 50 are integrally formed. Instead of this example, the inner grille 40 and the megaphones 50 may be configured as separate members, and the megaphones 50 may be integrated with the inner grille 40 using an arbitrary adhesion technique, or the megaphones 50 may be integrated with the inner grille 40 via arbitrary fixings. Even when the inner grille 40 and the megaphones 50 are configured as separate members, both the pressure stiffness and the sound pressure can be ensured with the above embodiment.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A front end structure of a vehicle body, the front end structure comprising:
    a horn;
    a bumper cover;
    an inner grille disposed between the horn and the bumper cover, and
    a megaphone including a megaphone wall defining a first opening end, a second opening end, and a megaphone opening extending between the first opening end and the second opening end along a direction along which the horn and the bumper cover are aligned,
    wherein the first opening end of the megaphone opposes the horn,
    an entirety of the second opening end of the megaphone opposes the bumper cover such that the entirety of the second opening end of the megaphone is covered with the bumper cover when viewed from a front of the vehicle body, and
    the megaphone is integrated with the inner grille.

2. The front end structure of the vehicle body according to claim 1, wherein
    the entirety of the second opening end of the megaphone is hidden by the bumper cover when viewed from the front of the vehicle body.

3. The front end structure of the vehicle body according to claim 2, wherein
    a space is provided between the bumper cover and the inner grille.

4. The front end structure of the vehicle body according to claim 1, wherein
    a cross-sectional shape of the megaphone opening in a cross section that is perpendicular to the direction along which the horn and the bumper cover are aligned is round.

5. The front end structure of the vehicle body according to claim 1, wherein
    a cross-sectional area of the megaphone opening in a cross section that is perpendicular to the direction along which the horn and the bumper cover are aligned monotonically increases from the first opening end toward the second opening end.

6. The front end structure of the vehicle body according to claim 1, wherein
    the horn, the bumper cover and the megaphone are aligned such that any straight line extending from any point on the horn toward the bumper cover through the megaphone hole penetrates the bumper cover.

7. The front end structure of the vehicle body according to claim 1, wherein
    the inner grille comprises an opposing wall and a rear wall disposed behind the opposing wall in a front-rear direction of the vehicle body.

8. The front end structure of the vehicle body according to claim 7, wherein
    the megaphone penetrates the inner grill through the opposing wall and the rear wall.

9. The front end structure of the vehicle body according to claim 8, wherein
    the megaphone wall of the megaphone projects frontward beyond the opposing wall of the inner grille in the front-rear direction of the vehicle body such that the second opening end of the megaphone is positioned frontward of the opposing wall of the inner grille in the front-rear direction of the vehicle body.

10. The front end structure of the vehicle body according to claim 8, wherein
the megaphone wall of the megaphone projects rearward beyond the rear wall of the inner grille in the front-rear direction of the vehicle body such that the first opening end of the megaphone is positioned rearward of the rear wall of the inner grille in the front-rear direction of the vehicle body.

\* \* \* \* \*